(12) United States Patent
Tsukagoshi et al.

(10) Patent No.: US 6,990,144 B2
(45) Date of Patent: Jan. 24, 2006

(54) SYSTEM AND METHOD FOR OVERRUN CATCH-UP IN A REAL-TIME SOFTWARE

(75) Inventors: Ikuo Tsukagoshi, Tokyo (JP); Jason N. Wang, San Jose, CA (US); Klaus Zimmermann, Deizisau (DE); Masahito Yamane, Kanagawa (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 523 days.

(21) Appl. No.: 10/014,733

(22) Filed: Dec. 11, 2001

(65) Prior Publication Data

US 2002/0190888 A1    Dec. 19, 2002

Related U.S. Application Data

(60) Provisional application No. 60/254,834, filed on Dec. 11, 2000.

(51) Int. Cl.
*H04N 7/12*    (2006.01)

(52) U.S. Cl. ............... 375/240.01; 370/509; 714/775
(58) Field of Classification Search ........... 375/240.05, 375/240.03, 240.01; 370/509; 714/775
See application file for complete search history.

(56) References Cited

U.S. PATENT DOCUMENTS

| | | | |
|---|---|---|---|
| 5,760,836 A * | 6/1998 | Greenfield et al. .... | 375/240.05 |
| 5,862,153 A * | 1/1999 | Kikuchi et al. .............. | 714/775 |
| 5,960,006 A * | 9/1999 | Maturi et al. ................ | 370/509 |
| 6,278,735 B1 * | 8/2001 | Mohsenian ................. | 375/240 |
| 6,763,067 B2 * | 7/2004 | Hurst ..................... | 375/240.03 |

* cited by examiner

*Primary Examiner*—Gims Philippe
(74) *Attorney, Agent, or Firm*—John P. O'Banion

(57) ABSTRACT

A system and method for processing an overrun in the encoding of an input bitstream are described. In one embodiment, an overrun in the encoding of an input bitstream is determined and the severity of the overrun is determined. Finally, a current frame is encoded using a catch-up mode to process the overrun.

20 Claims, 7 Drawing Sheets

SYSTEM AND METHOD FOR OVERRUN CATCH-UP IN A REAL-TIME SOFTWARE

RELATED APPLICATIONS

The present application claims the benefit of U.S. Provisional Patent Application Ser. No. 60/254,834, filed on Dec. 11, 2000, and entitled "OVERRUN CATCHUP FOR ENCODER", which is herein incorporated by reference in its entirety.

FIELD OF THE INVENTION

The present intention relates to the design of encoding/decoding systems. More specifically, the present invention pertains to a software-based overrun catch-up system.

BACKGROUND OF THE INVENTION

The ever-increasing demand for high-quality audio video media has fueled the advent of audio and video storage and retrieval technology. In particular, one popular set of standards for audio and video compression is the MPEG (moving pictures experts group) standard. Today, there are several versions of the MPEG standard, each designed for different applications. Specifically, MPEG-2 is designed for high bandwidth applications such as broadcast television including high-definition television (HDTV). In order to listen and to view the content in an MPEG-2 transport stream, a system capable of encoding and decoding the compressed audio video data is essential.

A software encoder is designed to be optimal in an encoding scheme with a given CPU load to the normal input content bitstream. Sometimes the encoder spends too much time to complete the processing of a given frame when the input content bitstream characteristics exceed the predetermined complexity. This is called overrun. Under limited CPU cycle resources, overrun is unavoidable for a given software encoder. If during normal encoding mode, the overrun occurs, a real-time encoder should catch-up the overrun and should not skip any input data. The quality of a catch-up algorithm is related to: 1) how fast encoder can recover to normal mode, and 2) the quality of encoder output during catch-up mode.

What is required is a system and method for a software-based, overrun catch-up system that operates in real-time.

SUMMARY OF THE INVENTION

A system and method for processing an overrun in the encoding of an input bitstream are described. In one embodiment, an overrun in the encoding of an input bitstream is determined and the severity of the overrun is determined. Finally, a current frame is encoded using a catch-up mode to process the overrun.

Other features and advantages of the present invention will be apparent from the accompanying drawings and from the detailed description that follows.

DETAILED DESCRIPTION

Figure 1A:
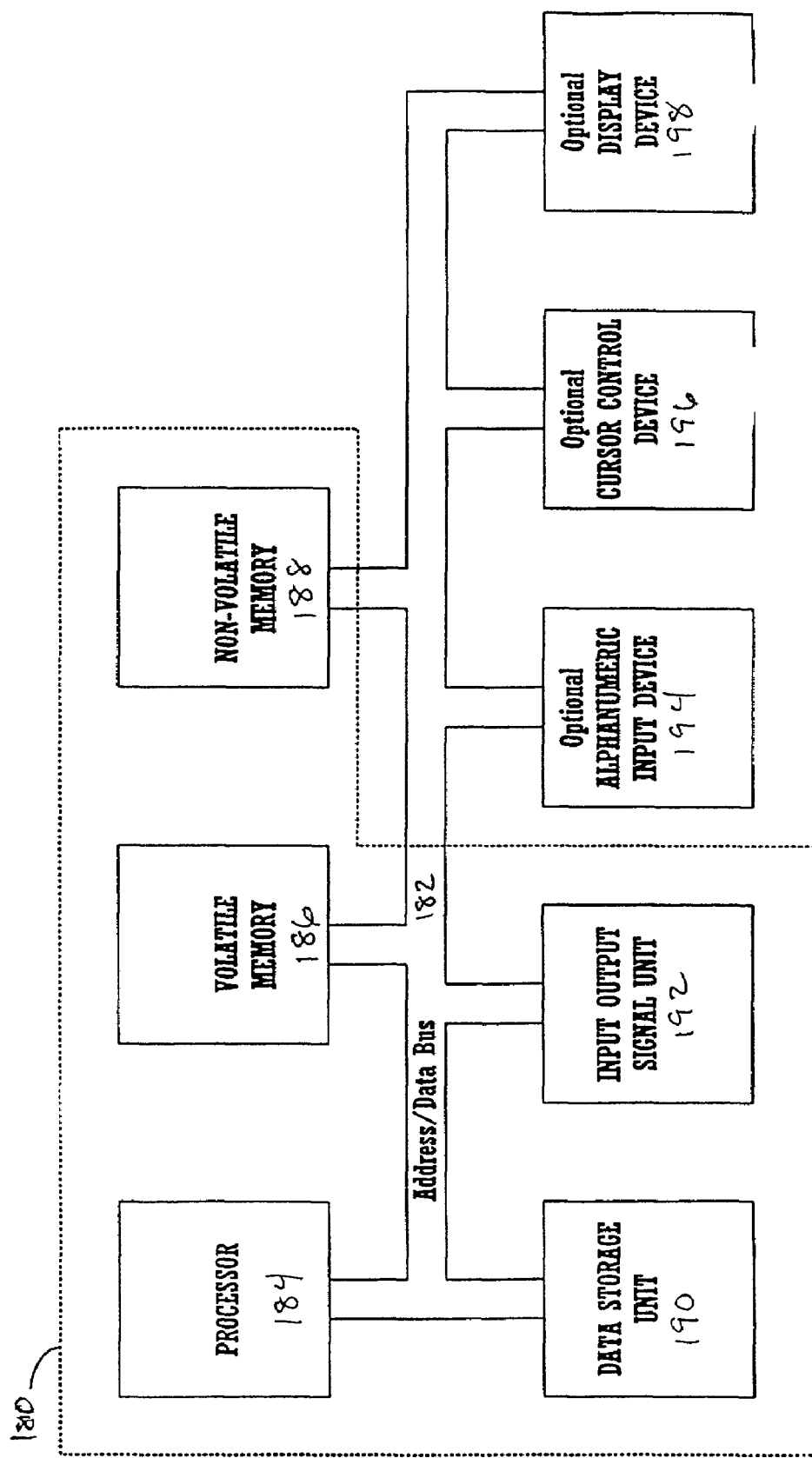
FIG. 1a is a block diagram of one embodiment for a computer architecture.

A system and method for processing an overrun in the encoding of an input bitstream are described. In one embodiment, an overrun in the encoding of an input bitstream is determined and the severity of the overrun is determined. Finally, a current frame is encoded using a catch-up mode to process the overrun.

In the embodiments described herein, the overrun catch-up encoder provides for limited overrun such that, in the worse-case, the encoder should run less than (n×T) timing periods to finish the input signal with timing length of T (wherein T is one frame time) and where n is a fixed constant. In addition, the embodiments provide that any catch-up levels should not cause further overrun. Further, the embodiments provide that there must be a catch-up level, which can finish encoding within (1−t)×T time even in the worse case, where t is a fixed number. Thus, in the embodiments described herein, n, t, and levels of catch-up mode may be chosen for each individual implementation where n is not infinitely large and t is not infinite small in order to optimize the overrun catch-up system.

In one embodiment, a software real-time MPEG video encoder is described. In this embodiment, the encoder is designed to run in real-time with no frame dropping. If limited overrun is acceptable, the software encoder may use a more flexible algorithm to generate the best picture quality with limited hardware resources. In alternate embodiments, the software real-time encoder may be designed to encode any compressive coding stream such as, for example, MOTION JPEG, MOTION JPEG-2000, DV, H.261, H.263, MPEG-4, and the like.

In the embodiments described herein, the software real-time encoder system does not skip any input frames. In alternate embodiments, if limited overrun is acceptable, the encoder may yield better quality than forcing the encoder to never overrun. As a result, the encoder may recover from the overrun without skipping input frames.

In one embodiment, the encoder system layer estimates the anticipated finishing time of the encoder and passes this information to the encoder. The encoder determines overrun situation using this information and the overrun situation is detected before next encoding start. Further, in catch-up mode, the encoder does not overrun again.

In one embodiment, multiple algorithms within the encoder speed up encoding with certain quality loss. There are multiple levels of catch-up algorithms with different catch-up time and quality parameters available. These catch-up algorithms do not cause further overrun. In one embodiment, the catch-up algorithm encodes the worse case signal faster than real-time.

In one embodiment, during catch-up mode, the rate control algorithm may be different than during normal processing. In this rate control algorithm, more bits may be used to avoid dramatic quality dropping. The catch-up may choose different catch-up levels to yield both short catch-up time and good catch-up quality. In one embodiment, the encoder tries to use the normal encoding mode to determine if overrun has recovered without intervention. The encoder uses normal encoding mode during overrun as long as there is no input buffer overflow or output buffer underflow. If the buffer overflows a threshold amount, the encoder begins the catch-up mode without significant quality drop. If the encoder cannot recover from an overrun for a given period of time, the encoder begins the fast catch-up algorithm.

In one embodiment, the software encoder is designed to be normally optimal to process data in an encoding scheme with certain CPU load to the input source content sequence. In this embodiment, each module of the software encoder is scheduled to process the input stream in a normal complexity for real-time encoding. Under limited CPU cycle resources, if the input source content characteristics exceed the predetermined encoding complexity, an overrun occurs. To get good encoding quality for normal input, overrun is unavoidable for a real-time software encoder. In existing encoder systems, skipping an input signal frame will cause permanent loss of this input data. However, such a loss is not acceptable. Therefore, in one embodiment, the encoder system supports overrun in normal mode and guarantees catch-up when overrun occurs.

In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1a is a block diagram of one embodiment for a computer architecture. Referring to FIG. 1a, computer system 180 includes an address/data bus 182 for communicating information, central processing unit (CPU) 184 coupled with bus 182 for processing information and instructions, volatile memory 186 (e.g., random access memory RAM) coupled with bus 182 for storing information and instructions for CPU 184 any nonvolatile memory 188 (e.g., read-only memory ROM) coupled with bus 182 for storing static information and instructions for CPU 184. In accordance with the embodiments described herein, CPU 184 is a single processor having a single instruction pointer.

Computer system 180 also includes a data storage device 190 ("disk subsystem") such as, for example, a magnetic or optical disk or any storage device coupled with bus 182 for storing information instructions. Data storage device 190 includes one or more removable magnetic or optical storage media (for example, diskettes, tapes, or the like) which are computer readable memories. In accordance of the embodiments described herein, data storage device 190 may contain a bitstream of encoded information. Memory units of system 180 include 186,188, and 190. Computer system 180 may also include a signal input output communication device 192 (for example, modem, network interface card NIC) coupled to bus 182 for interfacing with other computer systems. In accordance with the embodiments described herein, signal input/output communication device 192 may receive an incoming encoded bitstream.

Also included in computer system 180 is an optional alphanumeric input device 194 including alphanumeric and function keys coupled to bus 182 for communicating information and command selections to CPU 184. Computer system 180 also includes an optional cursor control or directing device 196 coupled to bus 182 for communicating user input information and command selections to CPU 184. An optional display device 198 may also be coupled to bus 182 for displaying information to the computer user. Display device 198 may be a liquid crystal device, other flat-panel display, cathode ray tube, or other display device suitable for creating graphic images and alphanumeric characters recognizable to the user. Cursor control device 196 allows the computer user to dynamically signal a two-dimensional movement of a visible symbol (cursor) on a display screen or display device 198. Many implementations of cursor control device 196 are well-known in the art including a trackball, mouse, touchpad, joystick, or special keys on alphanumeric input device 194 capable of signaling movement of a given direction or manner of displacement. Alternatively, it will be appreciated that the cursor may be directed or activated via input from alphanumeric input device 194 using special keys in key sequence commands. The present invention is also well suited to direct a cursor by other means such as, for example, voice commands.

It is appreciated the computer system 180 described herein illustrates an exemplary configuration of an operational platform upon which embodiments described herein may be implemented. Nevertheless, other computer systems with different configurations may also be used to place a computer system 180 within the scope of the embodiments.

Figure 1B:
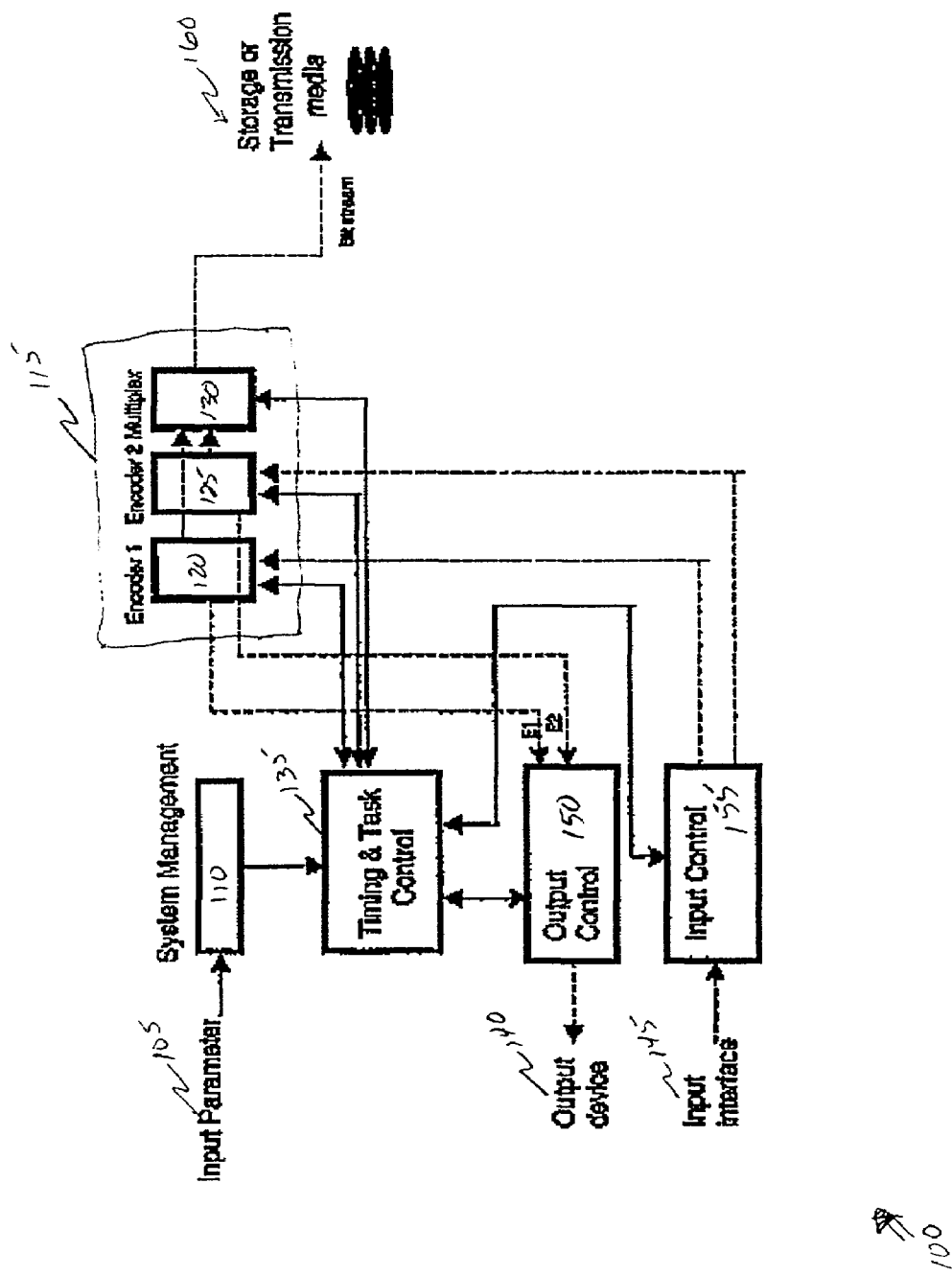
FIG. 1b is a block diagram of one embodiment for a real-time encoder system.

FIG. 1*b* is a block diagram of one embodiment for a real-time encoder system 100. Referring to FIG. 1*b*, input interface blocks 145 receive audio/video input signals. Encoder 115 encodes audio input signals and video input signals separately. For example, video encoder 120 encodes video signals and audio encoder 125 encodes audio signals. Multiplexer 130 multiplexes the compressed outputs of encoders 120 and 125 and sends the multiplexed signal to storage or transmission medium 160. If there is local decoder output, local decoder output will be sent to the output unit. Timing and task control 135 synchronizes each encoder 120 and 125 to the input signal and with each other. In alternate embodiments, multiple encoders 115 may be utilized in one encoder system 100.

Figure 2:
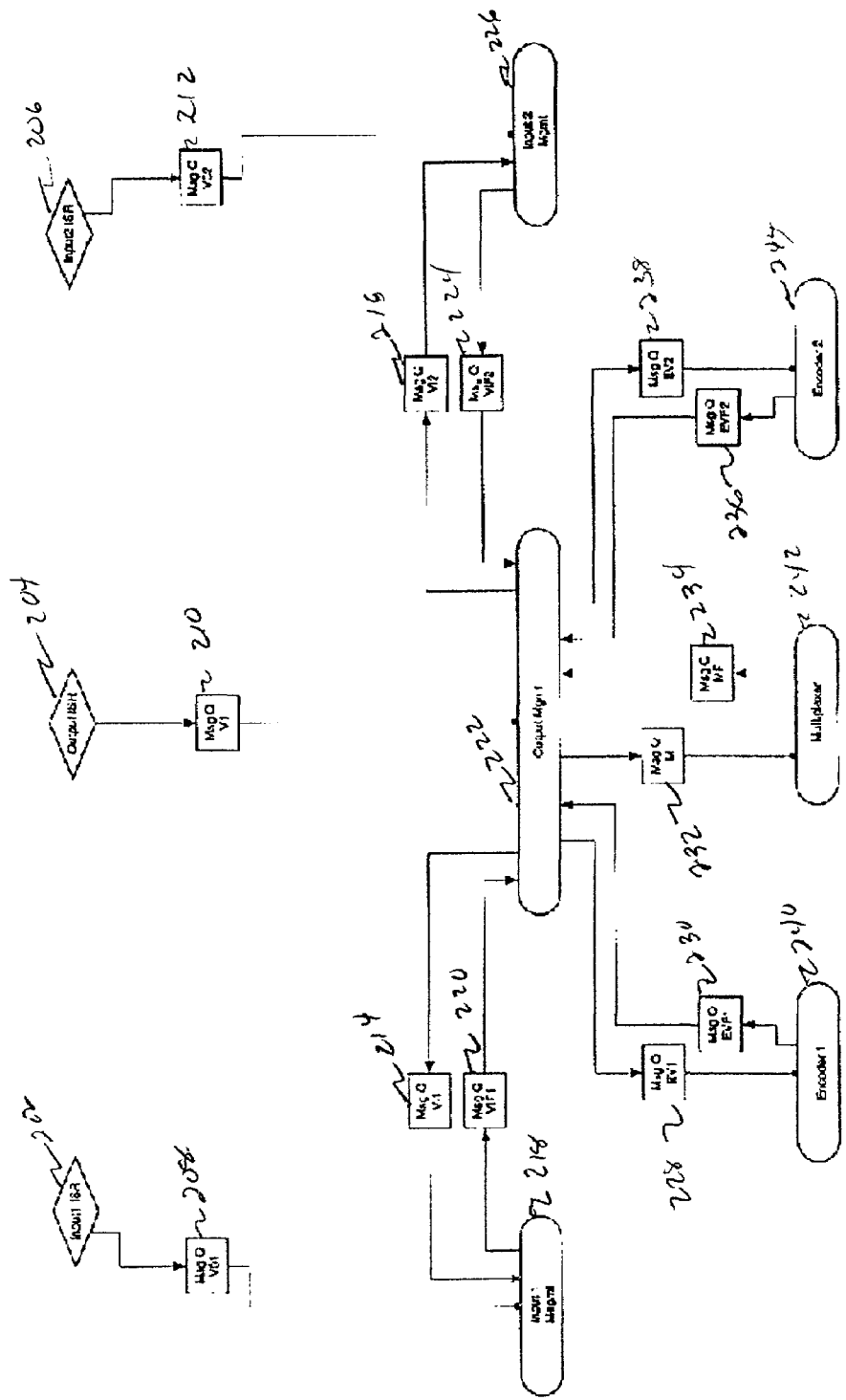
FIG. 2 is a flow diagram of one embodiment for an overrun, catch-up encoder system.

FIG. 2 is a flow diagram of one embodiment for an overrun, catch-up encoder system. The encoder system layer runs an output thread 222 that instructs the encoder threads 240 and 244 to execute by sending a message through the message queue EVx228 and 238, where x refers to the ordinal number of the scheduled encoder thread 240 and 244 respectively. In one embodiment, the system may schedule two encoder threads 240 and 244 so x can either be 1 or 2. The message sent through the message queue EVx 228 238 from the system layer to the video encoder thread 240 and 244 contains a parameter $T_{finish}$ which is the expected finishing time of the encoder thread 240 and 244. The message queue EVx 228 and 238 are shown in FIG. 2 among the other message queues 208, 210, 212, 214, 216, 220, 224, 225, 230, 232, 234, and 236. The execution frequency in "normal mode" of the encoder thread 240 and 244 is once per frame. "Normal mode" is defined as the mode in which no overrun occurs and the system can execute all scheduled threads in real-time.

In one embodiment, output thread 222 derives the parameter $T_{finish}$ each time a message is sent through EVx 228 and 238 to the encoder 115. The derivation of $T_{finish}$ is done by predicting the time when the next video output interrupt will arrive at the system 100. The combined execution time of all the threads being executed by the system (multiplexer, input management, etc.) is the time from the arrival of this interrupt to the start of the encoder thread 240 and 244 and is added as an offset to the predicted interrupt arrival time. The offset can be regarded as constant since the threads are (unlike the encoder thread) content-independent and always consume a constant number of execution cycles.

In one embodiment, the prediction of the interrupt arrival time may be calculated using standard time analysis prediction algorithms. The interrupt arrival time values are considered values of a time series. There exist a variety of time series models such as the auto-regressive moving-average (ARMA) model, which can be utilized in the prediction process. However, more sophisticated methods, such as Kalman filtering, may be employed.

Output thread 222 receives a feedback message through the message queue EVFx 230 and 236 from the encoder thread 240 and 244 respectively upon the encoder thread finishing processing. The availability of these feedback messages 230 and 236 determines whether the system identifies an overrun situation or not. However, encoder thread 240 and 244 recovers from the overrun situation as described below. The system layer only sends the expected thread finishing time $T_{finish}$ to the encoder thread 240 and 244.

Figure 3:
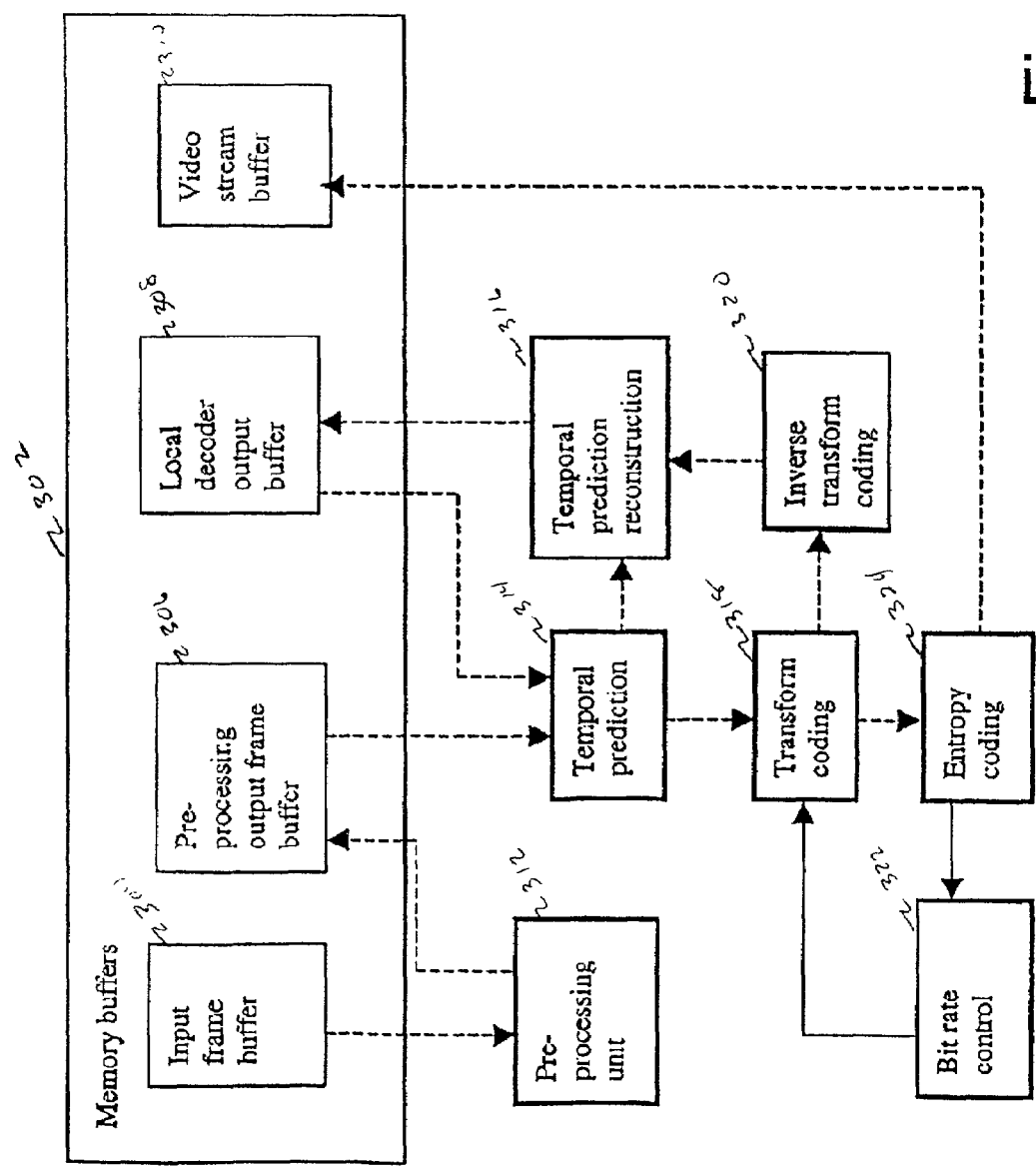
FIG. 3 is a block diagram of one embodiment for an MPEG video encoder.

FIG. 3 is a block diagram of one embodiment for an MPEG video encoder 120. FIG. 3 is used to illustrate the process of determining multiple encoding levels. Referring to FIG. 3, the encoding quality of encoder 120 depends on the complexity of encoding each input frame. For example, in a simple prediction between the current frame and an anchor frame, the predictive residual may be large and more bits are required to code the residual data of the frame. This means that bit rate control unit 322 should allocate more bits to the current frame to prevent the quality of the frame from dropping below a certain coding rate. Simple prediction leads to less computational complexity and allows fast encoding.

As another example, entropy-coding unit 324 may drop unimportant data. In this example, entropy coding is less costly in CPU processing. If entropy coding drops data, the encoding quality will drop as well. However, encoder 120 will run faster and fewer bits are used for the frame.

In yet another example, multiple of parameters may be used to make encoder 120 run faster. These parameters may be combined together to achieve multiple levels of fast encoding algorithms. In one embodiment, these levels consist of an overrun and catch-up algorithm set. In this embodiment, the best quality level may be used for normal encoding. This level may overrun as long as the maximum overrun to finish the input signal is less than (n×T) timing periods in which T is one frame time and n is a fixed constant. Further in this embodiment, for other than a normal encoding level, any subsequent level should not cause further overrun. Finally in this embodiment, there is at least one level that can finish encoding within (1−t)×T time even in the worse case, where t is a fixed number. This level will be used for final catch-up.

For example, an MPEG video encoder 120 may have three encoding modes: normal encoding, level-1 catch-up mode, and level-2 catch-up mode. In normal encoding mode, the maximum encoding time of one video frame is (n×T), where T is one frame time. By this mode, n is a finite number and smaller than the number of frame buffers for input and the number of frame buffers for output. In level-1 catch-up mode, encoder 120 finishes one frame in one frame time. In level-2 catch-up mode, encoder 120 finishes one frame in (1−t) frame time, where t is a fixed number smaller than 1.

Referring to FIG. 3, encoder 120 includes memory buffers 302 and a set of procedures. Uncompressed video input signal is saved in input frame buffer 304. Pre-processing unit 312 receives the input frames and pre-processes input video signal for better image quality. In this embodiment, the pre-processing may be noise reduction. The pre-processed frames are saved in pre-processing output frame buffer 306. Buffer 306 is the input source of other encoding procedures.

Temporal predict 314 receives the current frame in pre-processing output frame buffer 306. Using other frames in pre-processing output frame buffer 306 and local decoder output buffer 308, temporal predict 314 removes temporal redundancy in the current frame as much as possible. Typically, the redundancy portion is represented as motion vectors which are used for temporal prediction.

The residual value of the current frame is transferred to transform coding 318. Transform coding 318 applies a two-dimensional transformation such as, for example, discrete cosine transformation, and quantization to discover spatial redundancy within the residual value.

Quantization within transform coding 318 is controlled by bit rate control 322. In general, a higher quantization step size yields less number of symbols to encode and produces a poorer image quality as a less number of symbols may be encoded by less number of bits. The quantized transform coefficients and motion vectors are passed to entropy coding 324. The entropy-coded symbols are output as coded video stream and saved in video stream buffer 310.

Entropy coding 324 also feeds back the number of bits already consumed to bit rate control 322 so that bit rate control 322 may adjust the quantization step size used by transform coding 318 to maintain the desired bit rate of the output video stream. Quantized transform coefficients are also passed from transform coding 318 to inverse transform 320 which applies inverse quantization and inverse transform on these coefficients similar to the procedures in the video decoder.

Temporal prediction reconstruction 316 determines temporal prediction to emulate the temporal prediction in the decoder. Encoder 120 adds the residual value output from inverse transform coding 320 and the temporal prediction from temporal prediction reconstruction 316. This sum is saved in local decoder output buffer 308. As a result, the content of local decoder output buffer 308 will be the same as the output buffer on the decoder side. Encoder uses the frames in buffer 308 to perform temporal prediction for other frames. Thus, the temporal prediction on the encoder side will be the same as the temporal prediction on the decoder side.

If there are multiple encoders inside an encoder system, each encoder may have its own catch-up control unit or these encoders share one control unit.

Figure 4:
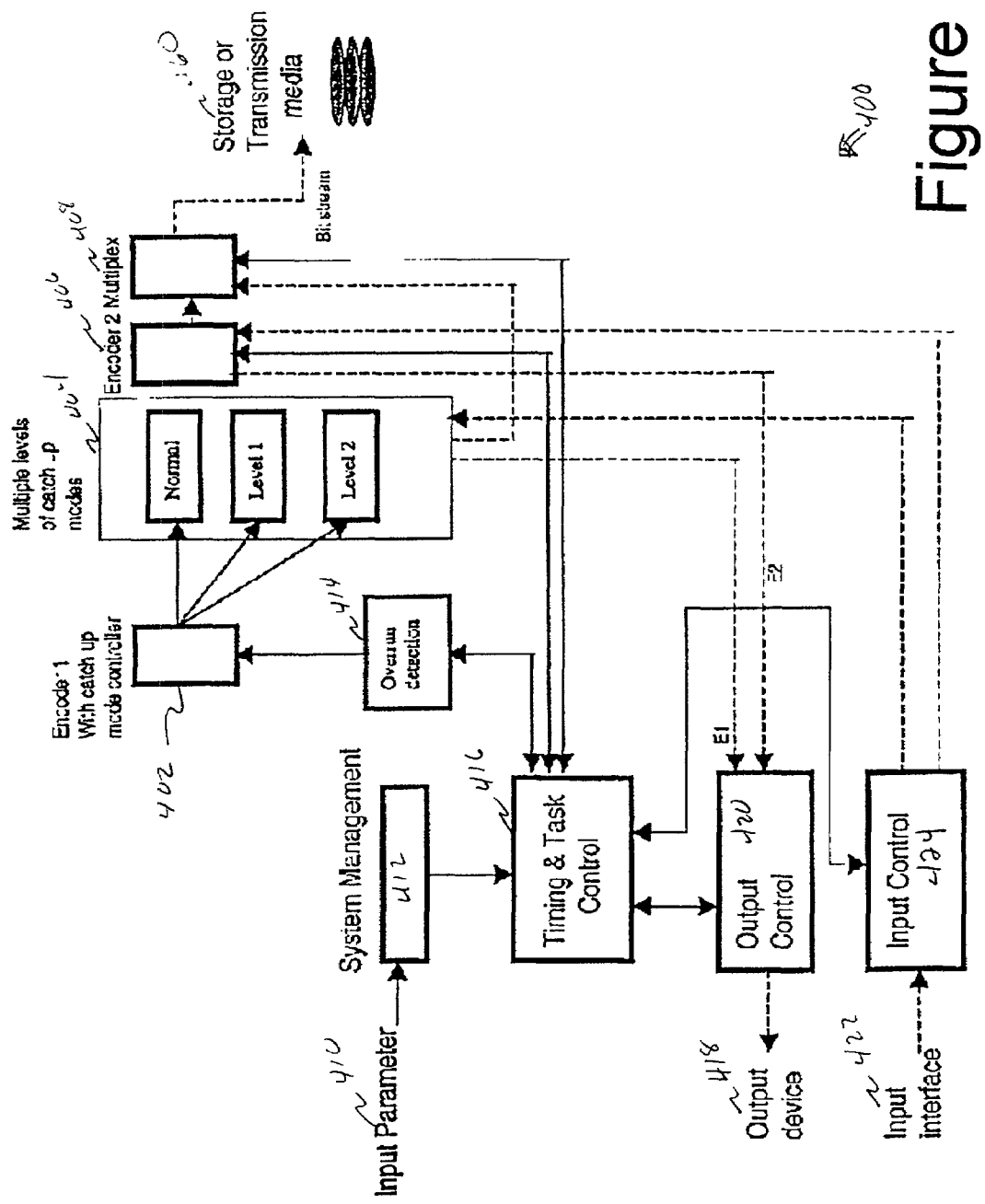
FIG. 4 is a block diagram of a second embodiment for an overrun catch-up encoder system.

FIG. 4 is a block diagram of a second embodiment for an overrun catch-up encoder system 400. Referring to FIG. 4, encoder-1 402 includes catch-up control unit 404 to handle overrun situations. The encoder system layer sends timing information to encoder-1 402 so that encoder-1 402 may detect if a previous encoding is overrun before encoder-1 402 starts the current frame encoding. Based on the overrun status, catch-up controller 404 may choose correct encoding level for the current frame.

Figure 5:
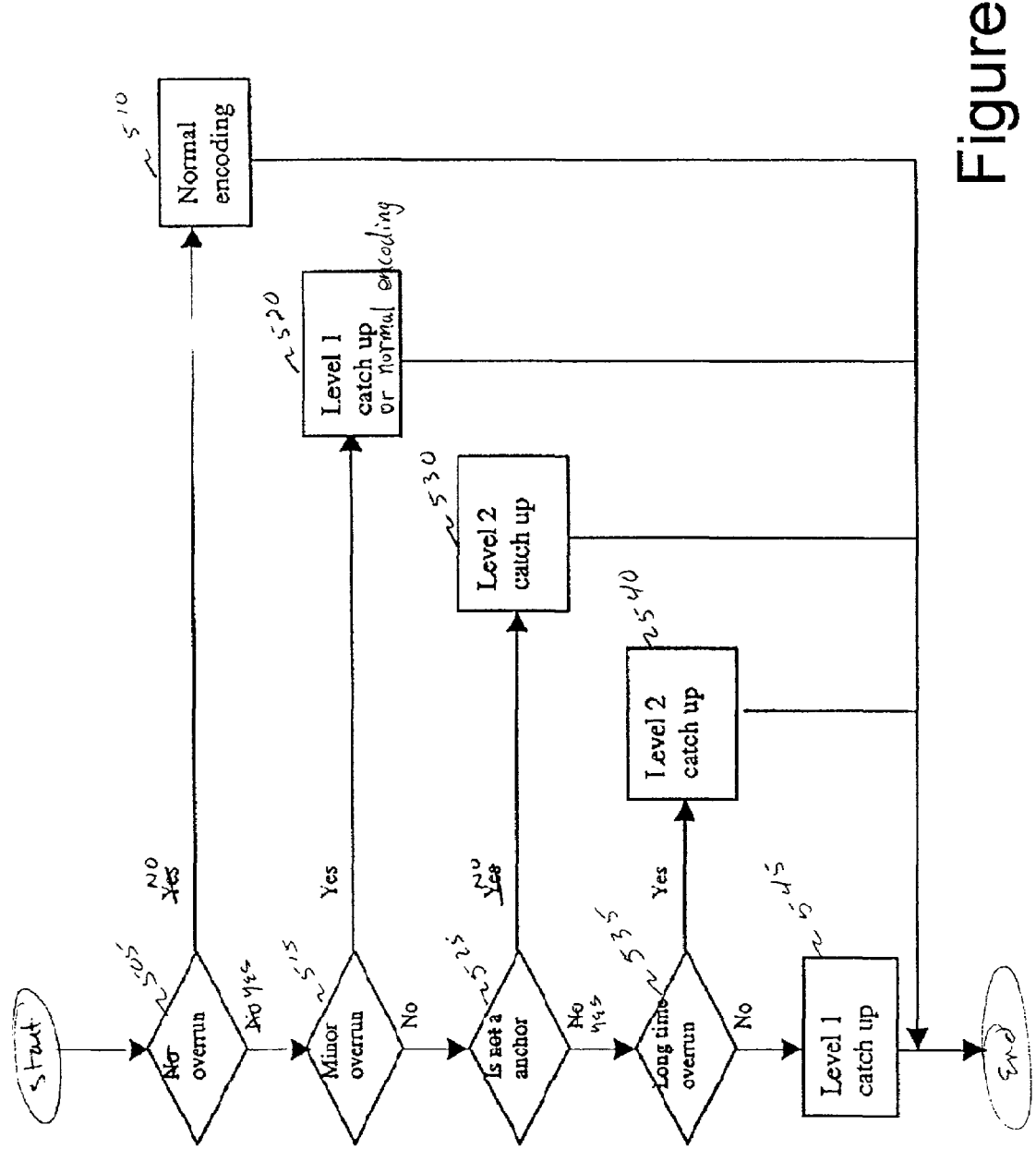
FIG. 5 is a flow diagram of one embodiment for determining catch-up levels within a catch-up controller of FIG. 4.

FIG. 5 is a flow diagram of one embodiment for determining catch-up levels within catch-up controller 404. In this embodiment, it is assumed that there is one normal encoding mode and two catch-up levels. Referring to FIG. 5, at processing block 505, it is determined if an overrun has occurred. If no overrun has occurred, processing continues as processing block 510. At processing block 510, the current frame is encoded using normal encoding mode.

If at processing block 505 it is determined that an overrun has occurred, processing continues at block 515. At processing block 515, it is determined if a minor overrun has occurred. If a minor overrun has occurred, then processing continues at block 520. A minor overrun is, for example, an overrun of less that a half frame time. At processing block 520, normal encoding or level-1 catch-up mode encoding is executed to process the overrun. If the system has extra frame buffers, for the minor overrun case, the encoder can still use normal encoding mode. Otherwise, the encoder can choose level-1 catch-up mode encoding to avoid further overrun which can cause buffer underflow or overflow.

If at processing block 515, if the overrun is significant (for example, more than 1 frame time), then processing continues at block 525. At processing block 525, it is determined if the current frame is an anchor frame. An anchor frame is used to predict other frames. If the current frame is not an anchor frame, then processing continues at block 530. At processing block 530, level-2 catch-up mode is executed to process the overrun.

If at processing block 525, an anchor frame is detected, then processing continues at block 535. At processing block 535, it is determined if the overrun is a long time overrun. In one embodiment, a long time overrun is determined by comparing the overrun time with a group-of-picture (GOP) time in which GOP time is the time required to process a set group of pictures (for example, 12). GOP length is the amount of data that may be encoded within a given time period. In this embodiment, the number of bits per picture is fixed. If the overrun is more than, for example, three frames, it will be difficult to maintain constant GOP codesize and level-2 mode encoding is requires. If a long time overrun is detected, processing continues at block 540. At block 540, level-2 catch-up mode is executed to process the overrun.

Depending upon the transmission method being used, it may be desired to have the bandwidth encoding to occur at a fixed rate. In this example, the catch-up scenario uses a simpler encoding method with some kind of picture quality degradation for a limited period. In another example, if the bandwidth encoding is flexible, in order to absorb bitrate differences, the encoder chooses an encoding method generating higher data rates.

If at processing block 535, a long-time overrun is not detected, then processing continues at block 545. At processing block 545, level-1 catch-up mode is executed to process the overrun.

Figure 6:
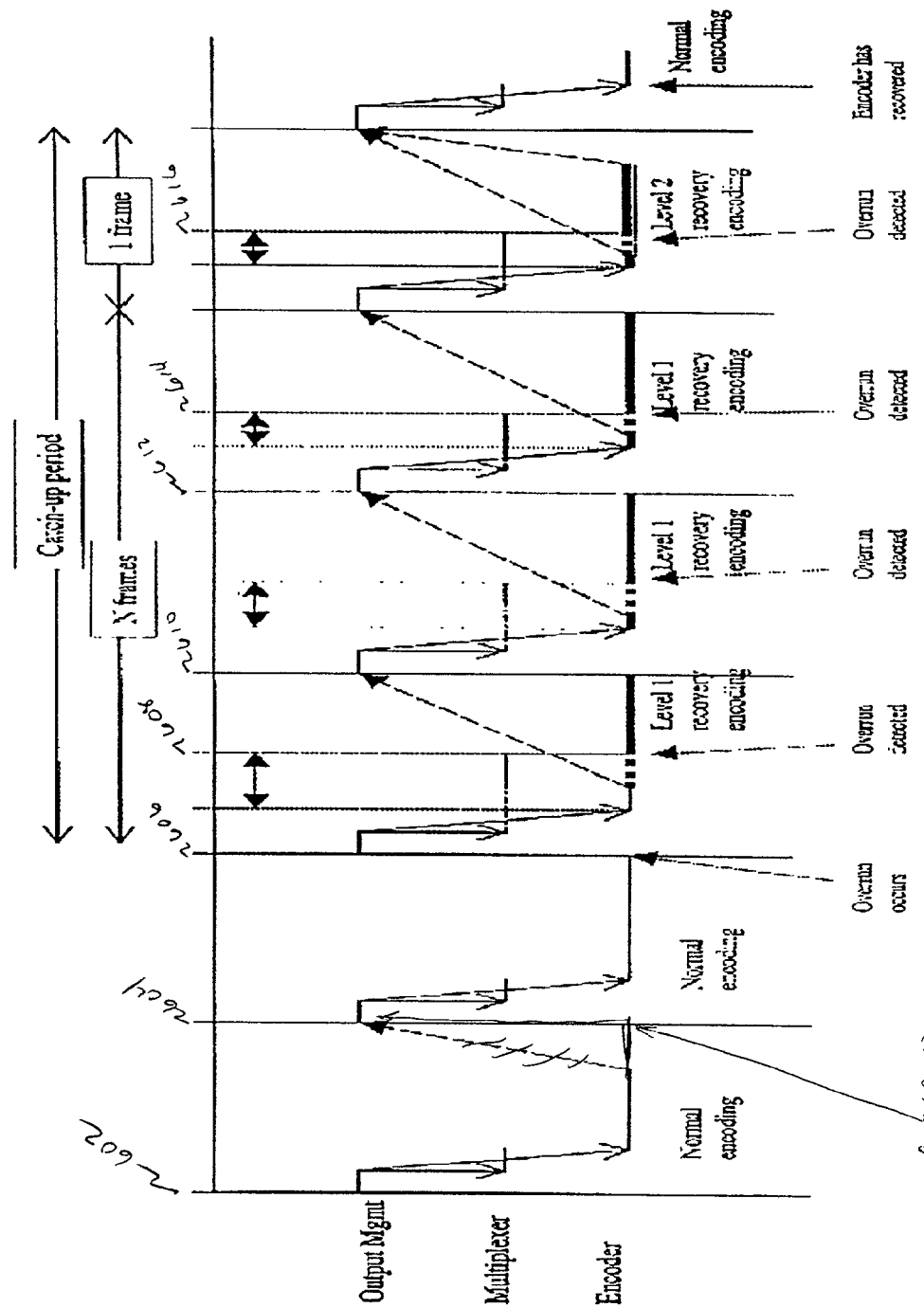
FIG. 6 is a timing diagram illustrating an overrun within an overrun catch-up encoder system.

FIG. 6 is a timing diagram illustrating an overrun. At time 604, encoder 402 causes an overrun. However, at this time 604, input buffer overflow and output buffer underflow have not occurred. In this example, normal encoding mode is used for the next frame with the prediction that the next frame encoding may recover the overrun. However, if the next frame causes further overrun at time 606, the input and output buffer usage may be over the given threshold. Encoder 402 begins level-1 catch-up mode to process the overrun. In level-1 catch-up mode, because a subsequent overrun is not predicted, the buffer usage can be managed without overflow or underflow. However, encoder 402 may require a few frames to recover from the overrun. If this occurs, encoder 402 switches to level-2 catch-up mode at 616 and resumes normal mode after the overrun is processed.

The specific arrangements and methods herein are merely illustrative of the principles of this invention. Numerous modifications in form and detail may be made by those skilled in the art without departing from the true spirit and scope of the invention.

What is claimed is:

1. A method of preventing encoding time overrun of an audio-video encoder, comprising:
   determining an encoding time overrun in the encoding of an input bitstream within which the encoding process for at least one of the frames received at the input of the encoder required more than one frame period to complete;
   determining the severity of the time overrun based on the time taken by the encoder to process frames; and
   encoding a current frame using at least one catch-up mode encoding method to process the current frame in equal to or less than a frame period toward reducing encoding time overrun in response to the severity of said encoding time overrun.

2. The method of claim 1 wherein encoding occurs without skipping a frame of the input bitstream.

3. The method of claim 1 further comprising:
determining an anticipated finishing time for the encoding when determining the severity of the time overrun.

4. The method of claim 3 wherein determining the severity of the overrun is based on upon the anticipated finishing time.

5. The method of claim 1 wherein determining the overrun occurs before encoding a next frame.

6. The method of claim 1 wherein a subsequent overrun does not occur during the catch-up processing.

7. The method of claim 1 wherein a plurality of catch-up modes are available to speed-up encoding of the bitstream.

8. The method of claim 1 wherein the catch-up encoding mode comprises a simpler encoding method or generates higher data rates, toward reducing the time overrun for the encoder.

9. A system for encoding audio-video data comprising:
an encoder configured for encoding frames of audio and/or video;
a catch-up controller coupled to said encoder and configured to support multiple catch-up modes;
wherein said catch-up modes comprise encoding methods within said encoder for encoding incoming frames at equal to or less than a frame period; and
a time overrun detector configured for receiving timing information from said encoder and generating a signal to said catch-up controller for changing encoding modes to change the time taken by the encoder to process frames thereby controlling time overrun in said encoder.

10. The system of claim 9 wherein said encoder is configured to encode the input bitstream without skipping a frame of the input bitstream.

11. The system of claim 9 wherein said encoder is further configured for determining an anticipated finishing time for the encoding.

12. The system of claim 11 wherein said time overrun detector is configured for determining the severity of the overrun based upon the anticipated finishing time.

13. The system of claim 9 wherein said time overrun detector is configured to determine the overrun before encoding a next frame.

14. The system of claim 9 wherein said encoder is configured so that a subsequent overrun does not occur during the catch-up processing.

15. The system of claim 9 wherein said catch-up controller is configured with a plurality of catch-up modes available to speed-up encoding of the bitstream.

16. The system of claim 9 wherein each catch-up mode utilizes a simpler encoding method or generates higher data rates, thereby reducing the time overrun for the encoder.

17. The system of claim 9 wherein said catch-up modes can be selected which reach encoding completion in less time than the normal encoding mode which does not limit encoding to completion in a single frame period.

18. The system of claim 17 wherein said catch-up modes comprise at least a level-1 and level-2 catch-up mode;
wherein said level-1 catch-up mode is configured to complete encoding in approximately a single frame time; and
wherein said level-2 catch-up mode is configured to complete encoding in less than a single frame time.

19. A system of audio-video encoding, comprising:
means for encoding a frame of a received audio-video bitstream into a compressed output stream;
means for reducing the time required for the encoder to process a frame according to at least one catch-up mode; and
means for determining time overruns during said encoding in response to timing information received from said means for encoding and activating said catch-up mode of said encoding means towards limiting or preventing said time overruns.

20. A computer readable medium comprising instructions, which when executed on a processor, perform a method for audio-video encoding of a bitstream, the system comprising:
means for encoding a frame of a received audio-video bitstream into a compressed output stream;
means for reducing the time required for the encoder to process a frame according to at least one catch-up mode; and
means for determining time overruns during said encoding in response to timing information received from said means for encoding and activating said catch-up mode of said encoding means towards limiting or preventing said time overruns.

* * * * *